Oct. 2, 1973   W. H. BURROWS   3,763,296
METHOD FOR MAKING COLORED CONTOURED REPLICAS
Filed March 5, 1971   6 Sheets-Sheet 1

Oct. 2, 1973 W. H. BURROWS 3,763,296
METHOD FOR MAKING COLORED CONTOURED REPLICAS
Filed March 5, 1971 6 Sheets-Sheet 5

3,763,296
METHOD FOR MAKING COLORED CONTOURED REPLICAS

Walter H. Burrows, Atlanta, Ga., assignor to
American Charts Company
Filed Mar. 5, 1971, Ser. No. 121,433
Int. Cl. B29c 1/02
U.S. Cl. 264—71    4 Claims

ABSTRACT OF THE DISCLOSURE

A method of producing colored contoured replicas by effecting a number of photographic steps of a subject contoured surface, making a number of molds complementary to the surface of the subject contoured surface, making a number of draw-down impressions on plastic sheet material of the subject contoured surface and the complementary mold structure and thereafter producing replicas of the contoured surface on plastic sheet material by effecting a number of still other photographic processes. A draw-down chamber is provided for effecting draw-down impressions on plastic sheet material against the contoured surfaces of the molds by creating a vacuum between the plastic sheet material and the upper surface of the molds, heating the plastic sheet material and applying pressure to the upper surface thereof to effectively press the heated plastic sheet material against the contoured surface of the molds. A vacuum frame means is provided for bringing two drawn-down sheets of plastic material into complete registration contact with each other by exhausting the air therebetween to create a vacuum. The vacuum frame means is utilized to bring two sheets of plastic material into complete contact with each other in certain of the photographic steps to produce the finished product of the contoured replica.

BACKGROUND OF THE INVENTION

This invention relates to a method of producing replication, to any number, of an original contour surface, such as a contour chart, in which surface features are represented by scale elevation above or below the base plane of the chart. More particularly, this invention relates to a method of producing a number of replicas of a contoured map wherein the replicas are true, the contoured surface precisely reproduces the original in every detail, markings are faithfully reproduced in their true relationship to both horizontal and vertical references and the original colors are maintained on all replicas.

Cartographic art relies upon a process of printing a projection of the original onto a sheet of white thermoplastic material, which is then subjected to heat and vacuum to draw it down over a contoured surface derived by a molding from the original.

Draw-down of preprinted thermoplastic material in the above described manner is subject to gross distortion, causing sometimes complete loss of registration between a contour feature such as rivers and its pictorial representation.

One of the prior art methods of producing contoured replicas is disclosed in a patent to Beato, No. 3,368,471 issued Feb. 13, 1968. The method of Beato is concerned solely with the contact printing from a contoured negative onto a contoured photo-sensitive surface, together with the equipment for producing intimate contact during the illumination step. The Beato method requires hand-scribing of the contoured surfaces. With color printing, this method of producing negatives would not only be very tedious, but would also eliminate the possibility of producing shading and tone effects intermediate between the primary colors. The method of Beato requires the use of dyes as a color medium which are required to be developed with ammonia fumes requiring special equipment and the color produced by these dyes is not desirable and is often subject to fading when exposed to light over a period of time.

Another common method of producing a colored contoured replica is effected by printing by a conventional letter press printing technique onto a surface and thereafter forming the surface to the contour of a subject mold. A problem of this method of producing contoured replicas is that in the forming of the contoured surfaces, the formation will occur in printed areas producing inaccurate shading and coloring of the formed areas. Further, due to the unpredictable variations and distortion from one piece of plastic material to the next piece of plastic material, due to variations in plastic thickness, heat intensity and mold temperature, it is impossible to accurately determine what the deformation of the printed areas will be. After a contoured replica has been produced by the above method, a tedious hand-scribing or hand-coloring process is required to touch up the colored contoured surfaces in order that they are remotely accurate. Further, this hand-scribing or touching up process must be repeated for each contoured sheet that is produced, resulting in an excessive amount of labor which would tremendously increase the cost of producing a number of colored contoured replicas.

SUMMARY OF THE INVENTION

It is therefore a primary object of this invention to provide a method of producing colored contoured replicas in which the amount of hand-scribing or touching up is reduced to a minimum.

A further object of this invention is to provide a method of producing colored contoured replicas which are extremely accurate in reproducing the contoured surfaces and the coloring of the contoured surfaces.

Another object of this invention is to provide a method of producing a number of colored contoured replicas in a mass production technique, which is extremely accurate in its contour and coloring characteristics.

Still another object of this invention is to provide a method of producing colored contoured replicas which does not require excessive amounts of complicated and expensive mechanism.

A still further object of this invention is to provide a method of producing colored contoured replicas in which the produced replicas will retain the coloring and contoured characteristics over a long period of time.

Yet another object of this invention is to provide a method of producing colored contoured replicas utilizing a combination of molding, vacuum forming and photographic techniques.

Another object of this invention is to provide a draw-down frame means which is effective for producing a draw-down plastic sheet of material of a contoured surface.

A further object of this invention is to provide a vacuum frame means for bringing two contoured sheets of plastic material in complete registration contact with each other whereby a photographic image on one sheet can be transferred to the second sheet through photographic processing.

An additional object of this invention is to provide a method and apparatus for producing colored contoured replicas which is simple in operation, economical in production and reliable in performance.

The above stated objects are obtained and the disadvantages of the prior art are overcome by the present invention which utilizes a combination of molding, vacuum forming and photographic techniques to produce contact prints on a contoured surface. One important feature of the present invention is the steps of producing a number of film positives, one for each of the colors red, blue, yellow of the subject contoured surface. The film positives are produced by first making a film negative of each of the colors through a filter screen for each individual color. After the film negatives have been produced the film positives are produced by exposing a fresh film through a half-tone screen to convert the film negatives into intensity characteristics representative of the color of the contoured surface. The film positives are printed onto a film to obtain half-tone color separated negatives which are used for enlargement onto a contoured plastic draw-down sheet in the development of each of these colors through photographic techniques.

A molded impression of the subject contoured surface is effected to produce a second subject having a contoured surface complementary to the surface of the subject mold. An important feature of this invention is that a number of these molded impressions are effected to be used later for drawing down plastic sheets of material there against. A number of draw-down impressions of clear plastic material is effected against the subject contoured surface and against the complementary mold impression. Another important feature of this invention resides in the fact that a plastic impression of clear plastic material is effected for the subject contoured surface as well as the complementary impression thereof whereby the produced replica will be extremely accurate in every detail when the color contact printed against a white plastic draw-down sheet is effected. The material on which the contoured replicas is to be produced is an opaque white plastic sheet which is drawn down against the original subject mold.

A number of contoured film positives are produced by supporting one of the previously formed clear vinyl plastic sheets drawn-down against the subject mold or a contoured duplicate thereof, coating the surface of the clear plastic sheet with a photographic emulsion, and exposing the emulsion coated plastic sheet through one of the half-tone separation negatives produced above for a specific number of seconds and thereafter removing the exposed film for development in a standard photographic manner. The process is repeated for each of the color separation half-tone film negatives.

Next a number of contoured film negatives are produced by distorting the clear plastic drawn down-sheets of the complementary impression of the subject mold, coating the supported plastic sheets with a photographic emulsion and exposing the supported plastic draw-down sheet and thereafter developing the plastic sheet through conventional photographic means. The process is repeated for each color separation half-tone which produces a contoured replica extremely accurate in both contoured and coloring characteristics.

These and other objects and advantages of the details of the method and apparatus will become apparent upon reading the following description of the illustrative embodiments thereof with reference to the attached drawings, wherein like reference numerals have been used to designate like parts throughout the several figures, and wherein:

DESCRIPTION OF THE ILLUSTRATIVE EMBODIMENT

Figure 1:
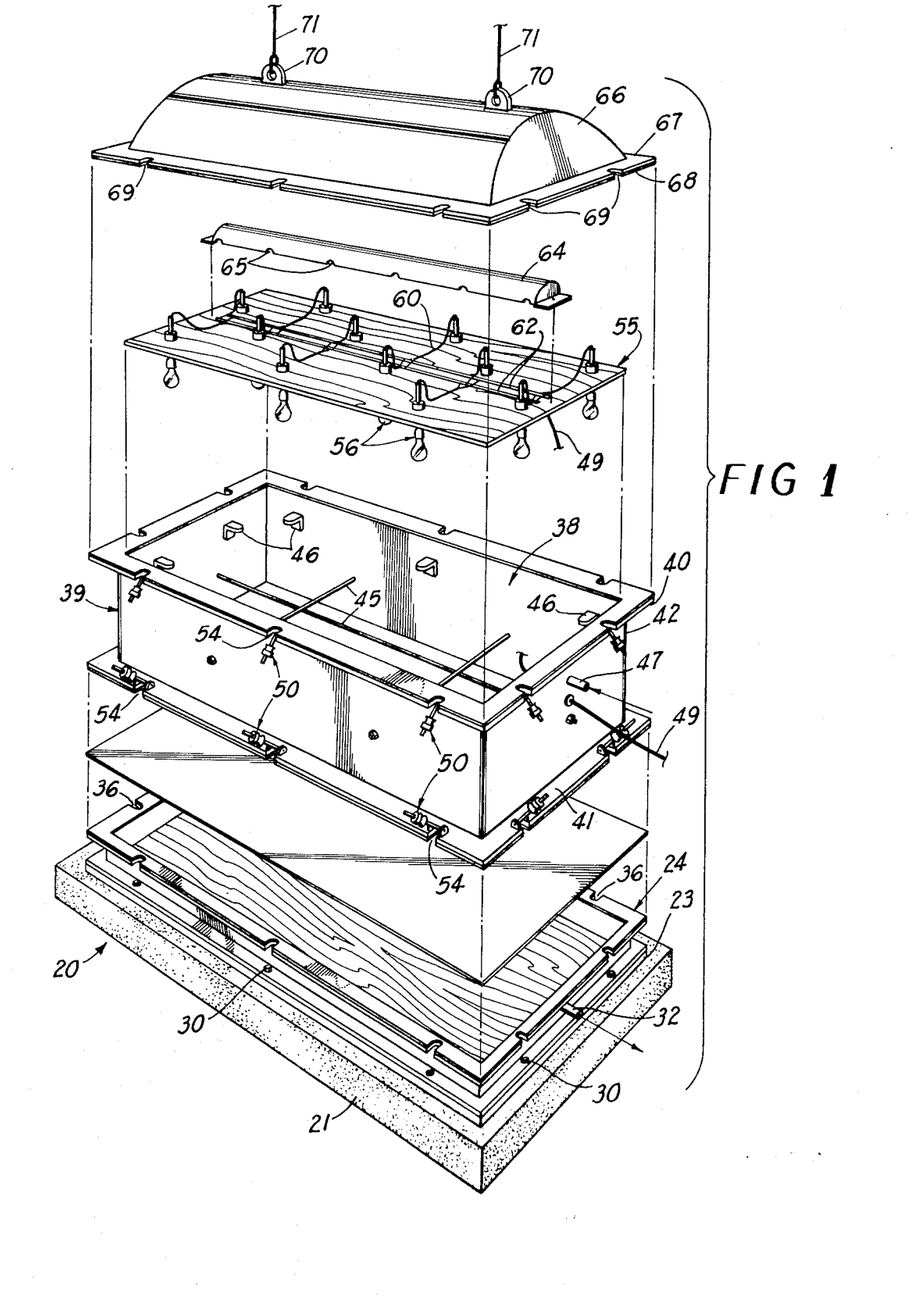
FIG. 1 is an exploded perspective view of the draw-down chamber utilized in the present invention.
Figure 2:
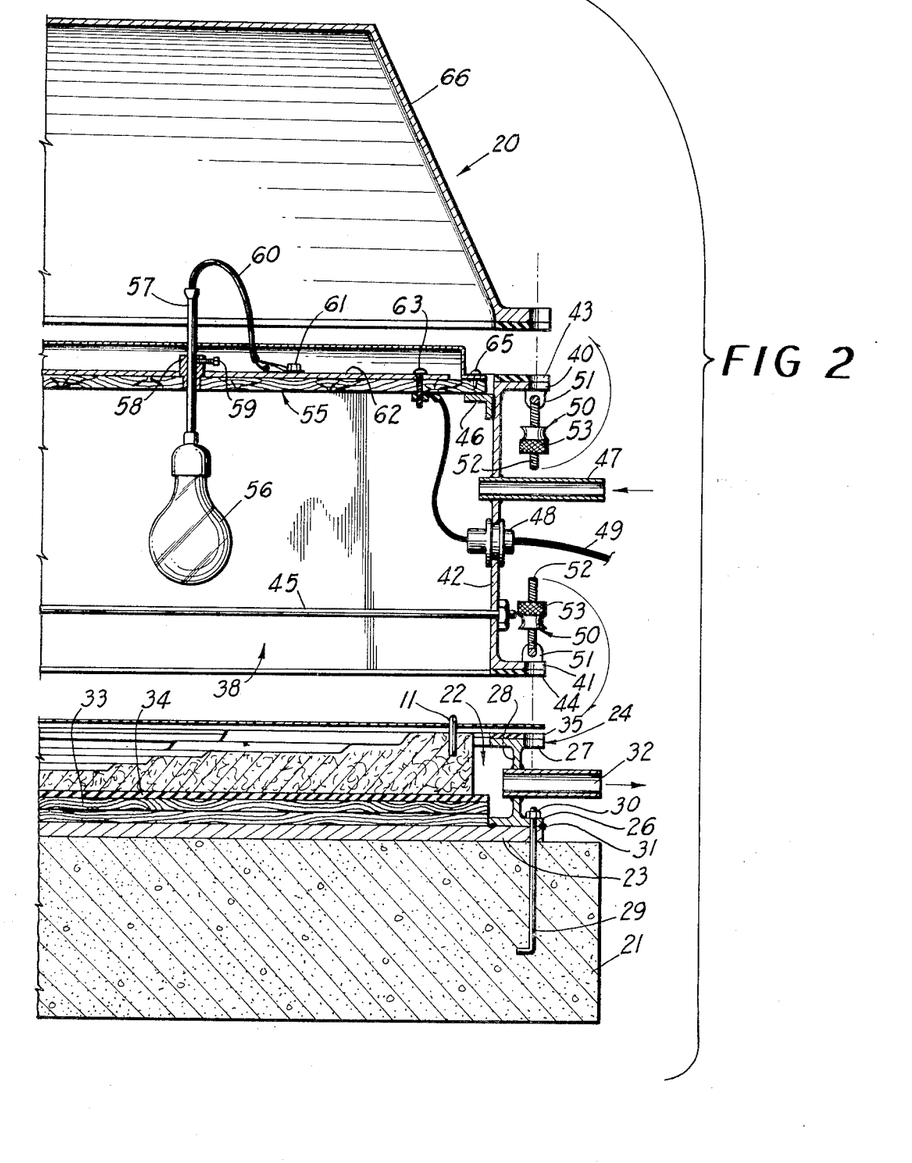
FIG. 2 is an enlarged fragmentary vertical sectional view of the draw-down chamber of FIG. 1.
Figure 3:
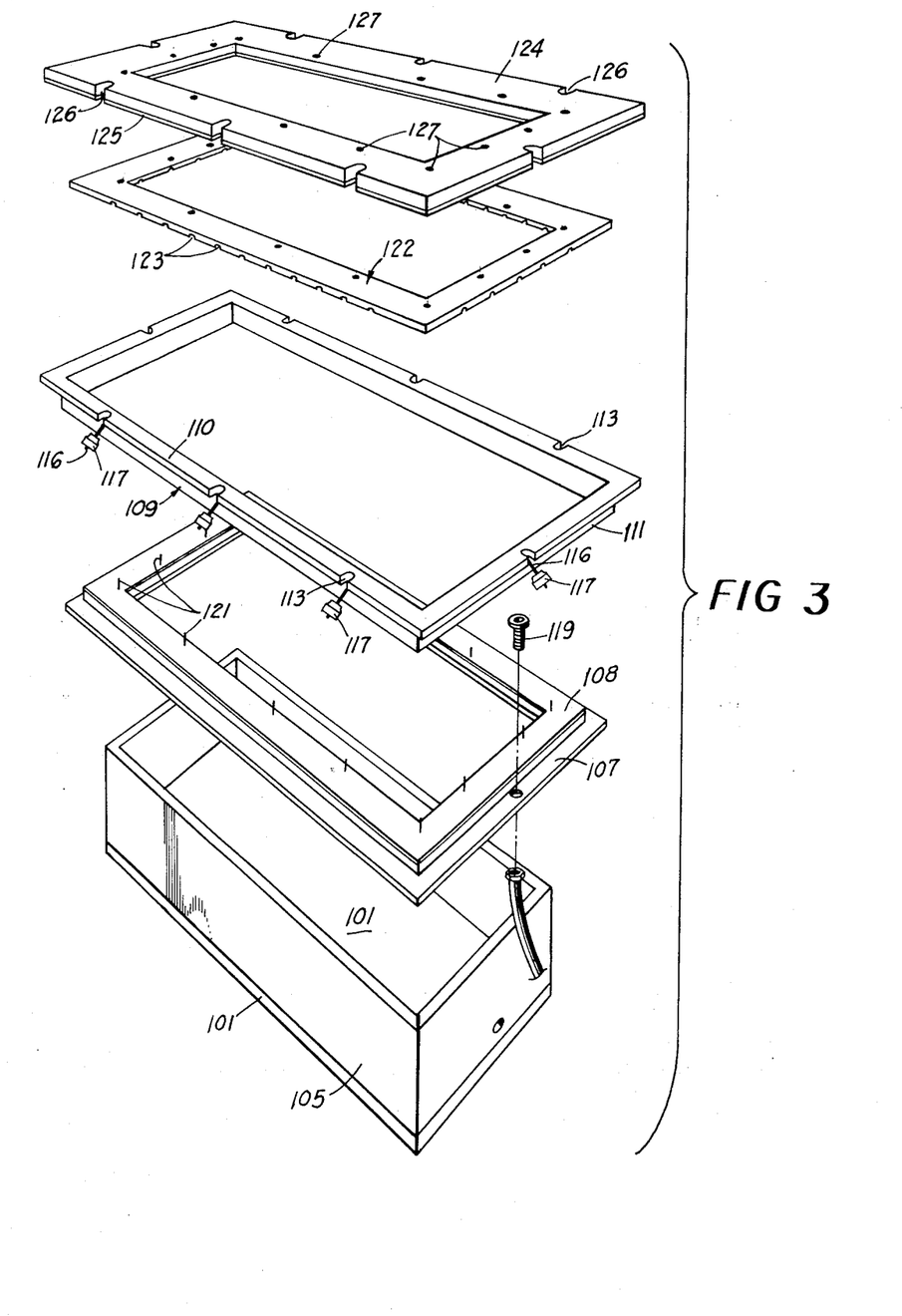
FIG. 3 is an exploded perspective view of a vacuum frame means utilized in the present invention.
Figure 4:
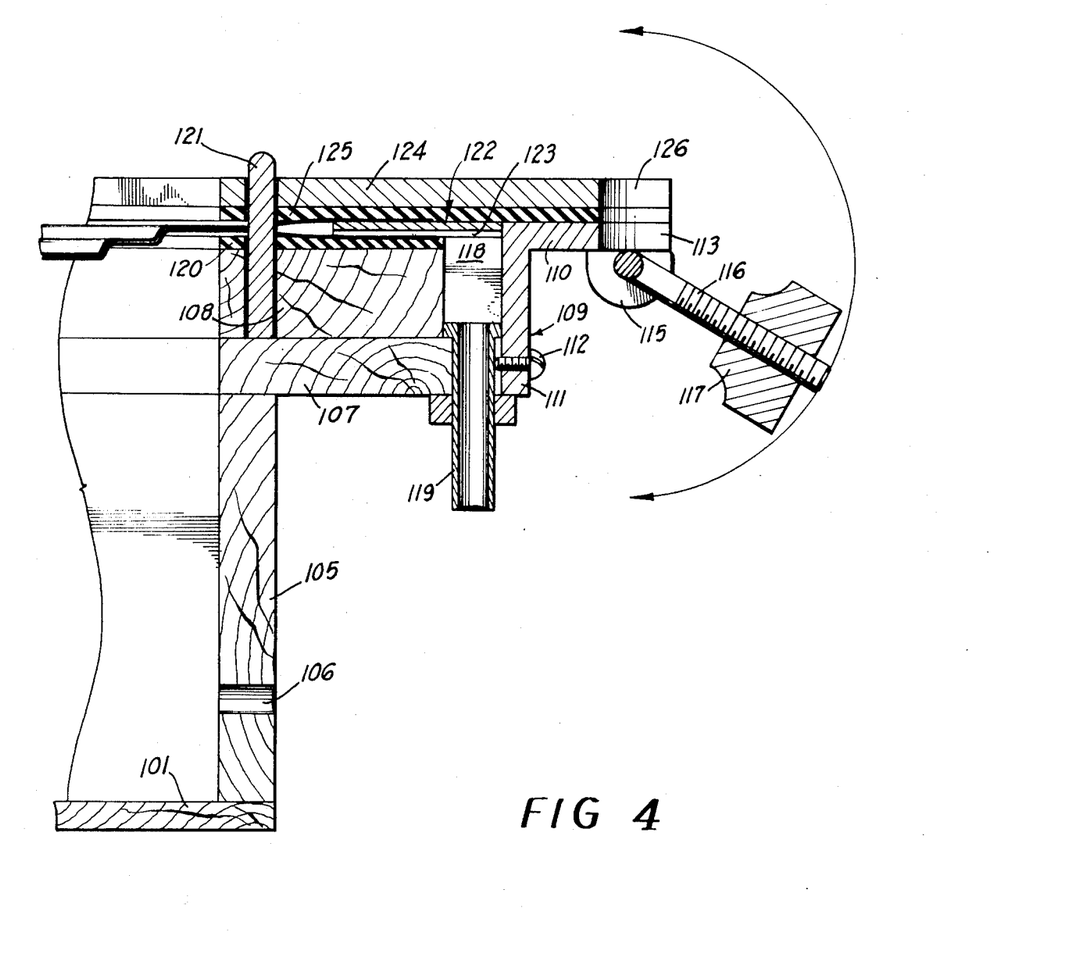
FIG. 4 is an enlarged fragmentary vertical sectional view of the vacuum frame means of FIG. 3.

Referring now to the drawings, the present invention will be described with reference to a draw-down chamber 20, as illustrated in FIGS. 1 and 2; a vacuum frame means 100 as illustrated in FIGS. 3 and 4 and an outline of the method, as shown in the schematic illustrations of FIGS. 5–12 and the flow diagram of FIG. 13.

The function of the draw-down chamber is to effect a draw-down impression on sheets of plastic material of the original subject to be reproduced and of complementary molds of the original subjects.

The function of the vacuum frame means is to effect a complete registration of two preformed sheets of plastic material produced in the draw-down chamber to allow color representations of the original subject to be transferred effectively to the preformed sheets of plastic material through various photographic techniques as will be described in more detail herein below.

Figures 12, 13:
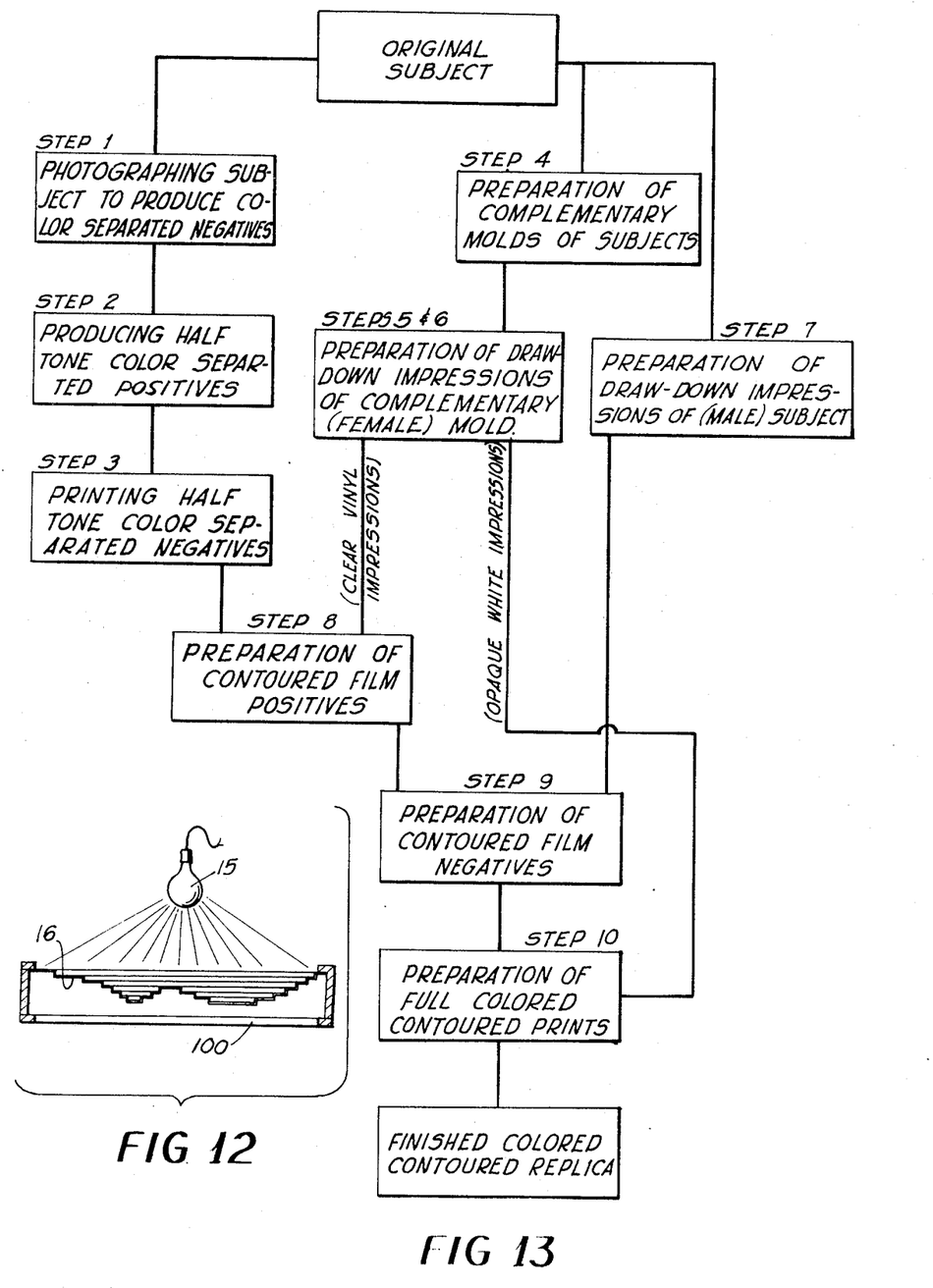
FIG. 12 is a schematic illustration of step ten (10)
FIG. 13 is a flow diagram of steps one (1) through ten (10) of the present invention.

As shown in the flow diagram of FIG. 13, the method of the present invention includes ten steps, a number of photographic steps, a number of molding and forming steps and still additional photographic steps to produce colored contoured replicas of the original subject.

The first (1) step includes photographing original subject contoured surface, independently through a number of colored filter screens to produce a corresponding number of film negatives, one representative of each of the colors to be reproduced.

The second (2) step includes producing a half-tone film positive from each of the film negatives by exposing a fresh film negative through a half-tone screen to convert the color image of the film negative into a dot pattern having varying intensity representative of the photographed color.

Step three (3) includes printing the half-tone film positive onto fresh film to obtain a half-tone color separated negative to be used in subsequent enlargement processes.

Step four (4) includes making a number of molded impressions of the subject contoured surface, each of the impressions including a surface portion complementary to the surface of the original subject and making a number of molded impressions of the complementary molds to produce a number of duplicate molds of the original subject.

Step five (5) includes making a number of draw-down impressions of clear vinyl plastic, drawn down against the complementary surface of the molded impressions.

Step six (6) includes making a number of opaque white plastic impressions drawn down against the complementary surface of the molded impression.

Step seven (7) includes making a number of clear vinyl plastic draw-down impressions, drawn down against the surface of the original contoured subject or a replica thereof.

Step eight (8) includes preparation of a number of contoured film positives, one for each color of the prepared half-tone negatives.

Step nine (9) includes preparation of colored contoured film negatives, one for each color of the contoured film positive.

Step ten (10), the final step, includes preparation of the full colored contoured replica on the opaque white plastic draw-down impressions.

DRAW-DOWN CHAMBER

Referring now particularly to FIGS. 1 and 2, the draw-down chamber includes a vacuum compartment 22, a pressure compartment 38, a heating deck 55 and a pressure dome 66, all of which are detailed to be supported and connected relative to each other to provide a draw-down chamber. As shown in FIG. 2, the draw-down chamber includes a supporting base 21 constructed of a material such as concrete or the like. A base plate 23 constructed of metal stock material is provided on the upper surface of the supporting base 21. The vacuum compartment 22 is constructed by forming a substantially rectangular frame 24 constructed of a conventional I beam metal stock material. The I beam includes a lower flange 26, an upper flange 27 and a connecting member 28. The I beam member is mitered and welded together at their abutting edges to form the substantially rectangular frame detailed in horizontal dimensions to fit over the base plate 23.

As shown in FIGS. 1 and 2, the rectangular frame 24 and base plate 23 are secured in position on the base 21 by means of a number of anchoring studs 29 which are positioned in the base 21 during the construction. The anchoring studs 29 includes end portions which extend above the upper surface of base 21 an amount to extend through the base plate 23 and lower flange 26 of the I beam construction. Each of the anchoring studs 29 includes a threaded upper end for receiving a conventional connecting bolt 30 for securely fastening the vacuum compartment 22 including base plate 23 and rectangular frame 24 to the support base member 21. The rectangular frame I beam is further secured to the base plate 23 by means of a weld bead 31 which extends around the edge of the base plate 23 and of the lower flange 26 of the rectangular frame construction 24 whereby the rectangular frame will be completely sealed to the base plate 23 to prevent seepage of air through the abutting surfaces thereof into the interior of the vacuum compartment 22.

As shown in FIGS. 1 and 2, a vacuum conduit connecting means 32 is provided for connecting a conventional vacuum pump means (not shown) to the interior of the vacuum compartment 22 for exhausting air therefrom. The vacuum connection 22 is mounted in the connecting wall 28 of the I beam rectangular frame means wherein a fluid flow passage extends therethrough. Mounted on the upper surface of the I beam flange 27 is a neoprene gasket member 35. The neoprene gasket member 35 is detailed in horizontal dimensions to be equal to dimensions of the upper surface of the flange 27 and is bonded thereto to effect a sealing relationship between the vacuum chamber 22 and a pressure chamber 38, which will be described in more detail herein below.

As shown in FIG. 2, means is provided for supporting a mold of contour surface within the vacuum compartment. The support means includes a number of plywood spacer elements 33 and a neoprene support pad 34. The number of plywood spacers will be determined by the thickness of the mold. The number should be detailed such that the uppermost surface of the mold is in horizontal alignment and located in the same plane as the upper surface of the gasket member 35. Further, in a supported relationship, the plywood spacers will be mounted on the base plate 23 with the neoprene pad 34 thereabove and located inbetween the spacers and the mold construction. The plywood spacers 33 will be added to the vacuum compartment or taken therefrom, as required, to locate the mold construtcion in detailed alignment as indicated herein above.

As shown in FIG. 1, the upper flange 27 of the I beam rectangular frame is provided with a number of inwardly directed notches 36 formed therein. The notches 36 are detailed for receiving a shank portion of a swing-away swivel bolt connection 50, as will be described in more detail herein below. The number of notches 36 and the number of swivel bolt connections is sufficient to insure that the pressure compartment 38 is properly sealed to the vacuum compartment 22.

The pressure compartment 38 includes a rectangular frame 39 constructed of conventional metal stock channel-shaped material with the channel being directed outwardly. The ends of the channel members are mitered and joined together by conventional means such as welding to form a substantially rectangular framework having horizontal dimensions equal to the horizontal dimensions of the vacuum compartment framework 24. The channel-shaped rectangular frame of the pressure compartment includes an upper flange 40 and a lower flange 41 connected by a vertical connecting plate 42. Neoprene gasket means 43, 44 are provided on the upper and lower surfaces, respectively, of the frame flanges 40, 41. The neoprene gaskets are bonded to the surfaces of the flanges 40, 41 by conventional adhesive material which will insure a complete sealing relationship between the neoprene gaskets 43, 44 and flanges 40, 41 respectively.

A number of reinforcing rods 45 are connected between opposite sidewalls of the rectangular pressure frame 39. The reinforcing rods 45 extend through complementary openings formed in the channel plate member 42 with threaded connecting bolts on an outward end thereof whereby the reinforcing rods will be maintained under tension to prevent bulking of the wall structures of the pressure compartment in response to pressure being applied to the interior area thereof.

As shown in FIGS. 1 and 2, a number of support tabs 46 are fixed to the interior surface of the pressure compartment 38. Tabs 46 include an upper horizontal supporting surface and a vertical mounting surface. The vertical mounting surface is secured to the walls of the frame 39 by conventional welding means. The upper horizontal supporting surface of each of the tabs are aligned relative to each other such that a heating deck 55 supported thereon will be in a substantially horizontal supported position. The number of tabs 46 can be varied depending on the dimensions of the pressure compartment.

A pressure connecting conduit means 47 is mounted in the frame plate member 42. The pressure conduit 47 is adapted to be connected to a conventional pressure pump means (not shown) whereby an amount of air steam or other gas under pressure can be introduced through the conduit means 47 into the interior area of the pressure compartment. Also mounted within the plate 42 of the channel-shaped pressure compartment frame is an insulated bushing 48 having a passageway extending therethrough for allowing an electrical supply line 49 to pass from the exterior of the frame wall into the interior area of the pressure compartment. The insulated bushing 48 is detailed in sealed relationship relative to the plate support member 42 whereby air under pressure will not escape through the insulated bushings or escape around the connecting edge thereof.

As shown in FIG. 2, a conventional swing-away connecting bolt means 50 is mounted on the inner surface of each of the channel flanges 40, 41. Swing-away bolts 50 are supported on the flanges 40, 41, by means of a support bracket 51 and includes an elongated threaded shank portion 52 having threadably received thereon an adjusting nut 53. The swing-away bolts 50 are supported by brackets whereby the bolts can be swung through an arc of substantially 180 degrees to allow the shank portion to be moved into a connecting position within a notch 36, provided on the pressure compartment, and a similar notch 69 provided on a pressure dome means 66.

As shown in FIG. 1, a notch 54 is provided in flanges 40, 41 in alignment with the swing-away bolts 50 to allow the shank portion to be swung to an adjustable connecting position. The number of swing-away bolts 50 and notches for receiving the same can be varied, the number being determined by the size of the draw-down chamber and by the amount of pressure and vacuum means to be applied thereto.

A heater deck means 55 is provided for insertion into the pressure compartment 38, as shown in FIG. 2. The heater deck 55 includes a rectangular plate element constructed of a non-conducting material such as a sheet of transite. The rectangular dimensions of the heater deck 55 is detailed such that the heater deck can be inserted within the interior area of the pressure compartment and such that the edges of the heater deck will be supported by the support tabs 46. A number of heating lamp means 56 are supported by the heater deck for heating the interior area of the pressure compartment to bring a sheet of synthetic material supported between the pressure compartment 38 and the vacuum compartment 22 to a desired temperature for draw-down. The number of heater lamps can be varied, the number being determined by the size of the draw-down chamber and the particular characteristics and dimensions of the sheet of synthetic material to be drawn down.

As shown in FIG. 2, each of the heat lamp means 56 includes an upwardly extending sleeve element 57 which is adjustably supported within collars 58. Collars 58 are inserted in openings formed in the heater deck 55 and includes an adjustable locking screw means 59 for supporting the sleeve 57 in a selected adjusted position therein. An electrical supply line 60 extends from the heat lamp means 56 upwardly through sleeves 57 and outwardly thereof for connection to a source of electrical energy. The electrical supply lines 60 are connected by conventional connecting bolts 61 to a pair of electrical conducting busbar elements 62. The pair of busbar elements 62 are supported in parallel relation on the upper surface of the heater deck 55 whereby the electrical supply lines 60 for each of the heating lamp means 66 can be connected thereto. The input supply line 49 is connected by conventional connecting bolt means 63 to the busbar conducting elements 62 whereby a source of electrical power can be supplied along the input supply lines 49 to the busbar 62 and then along the supply lines 60 to each of the heating lamps 56.

A cover 64 having a downward open cavity area is secured in position over the busbars 62 to prevent unwanted contact therewith during operation. Cover 64 is secured to the heater deck 55 by conventional connecting screw means 65, as shown in FIG. 2. A number of upwardly extending notches are provided in the periphery of cover 64 to allow the electrical supply line 60 to extend from an exterior portion thereof inwardly to be connected to the busbars 62.

Supported on and above the pressure compartment 39 is a pressure cover dome 66. The pressure cover dome 66 includes a rounded upper surface forming a downwardly opening cavity area detailed in dimensions for receiving the upwardly extending sleeves 57 of the heater lamps 56 in any of their desired adjusted positions. Extending around the periphery of the dome 66 is a horizontal ange 67. Flange 67 is provided with a neoprene gasket 68. Formed in flange 67 and gasket 68 is a number of outwardly directed notches 69. Notches 69 are detailed in number and location to be in alignment with the notches 54 and swing-away bolts 50 provided on the pressure compartment 38.

As shown in FIG. 1, a pair of upstanding bracket elements 70 are provided thereon for receiving conventional hoist line means 71. Due to the size and weight of the various compartments and elements of the draw-down chamber, a conventional hoist means (not shown) can be utilized to move and manipulte the various parts in the operation of the draw-down chamber.

OPERATION OF DRAW-DOWN CHAMBER

In a drawn-down operation, the pressure compartment 38, heater deck means 55 and pressure dome 66 are moved to an elevated position above the vacuum compartment 22 by means of the conventional hoist line means 71. With the interior area of the vacuum compartment 22 exposed, a subject mold 10 is inserted into the interior area of the vacuum compartment. The subject mold is placed on the neoprene pad 34 with a number of plywood spacer elements 33 inserted thereunder until the uppermost surface of the subject mold is in the same plane and in horizontal alignment with the upper surface of the neoprene gasket 35. After a subject mold has been positioned within the vacuum compartment a number of plywood spacers (not shown) are inserted around the periphery of the subject mold to prevent the plastic draw-down sheet from being drawn-down around the periphery of the mold.

With the subject mold in position in the vacuum compartment 22, a plastic draw-down sheet is placed in position thereabove whereby apertures formed in the plastic draw-down sheet will be in engagement and alignment with a number of registration pins 11 formed in the subject mold. Registration marks are placed on the original subject and will appear on the photographs. The registration pins 11 must be placed on the mold at the location of registration marks. The plastic sheets must be provided with apertures which will align with registration pins. The plastic drawn-down sheet is detailed in dimensions to extend to the outer edge of the vacuum compartment framework and is supported on the upper surface of the neoprene gasket 35.

After the plastic drawn-down sheet and the subject mold have been properly positioned in the vacuum compartment 22, the pressure compartment 38 is lowered into position with the bottom surface of neoprene gasket 44 resting on the upper surface of a drawn-down sheet which is supported in position above neoprene gasket 35 and with the notches 54 formed in the compression compartment in alignment with notches 36 formed in the vacuum compartment. The swing-away bolts 50 are then pivoted through 180 degrees to allow the bolt shank portion 52 to move within the notches 36, 54 and the adjusting nuts 53 are tightened until the draw-down sheet is securely clamped between the pressure compartment 38 and vacuum compartment 22.

With the pressure compartment 38 secured in position, the swing-away bolts 50 are disconnected from the pressure dome 66 and the pressure dome is elevated to a vertically spaced position to expose the upper surface of the heater deck 55. After the upper surface of the heater deck 55 has been exposed, the heating lamp means 56 are adjusted vertically relative to the plastic drawn-down sheet by loosening the locking screw means 59 within collars 58 and sliding sleeves 57 therethrough to a desired adjusted position, after which the locking screw means 59 are again tightened to securely clamp and hold the heating lamp means 56 in a selectively set position. While making vertical adjustment of the heating lamp means 56, the number of heat lamp means can be connected or disconnected from the busbar electrical supply means 62, as would be required to perform the required heating operation of the plastic drawn-down sheet means. With the heat lamp means 56 in their desired set position and with the required number of heat lamps 56 connected for receiving electrical power, the cover 64 is connected in position above the busbar means 62 and then the pressure dome 66 is lowered into position over the pressure compartment.

When the pressure dome 56 is moved into position, the neoprene gasket member 68 of the pressure dome will rest on and engage the upper neoprene gasket means 43 of the pressure compartment, after which the swing-away bolts 50 supported on the underside of the flange 40 will be moved into position within notches 54 and 69 with the adjusting nut 53 located above flange 67. Then the adjusting nut 53 is tightened to securely clamp the pressure dome means 66 onto the pressure compartment means 38.

After the drawn-down chamber has been completely assembled as described herein above, a vacuum supply means is connected to the vacuum connecting element 32, an electrical supply means is connected to the input supply line 49, and then a pressure supply means is connected to the pressure supply element 47.

After a sheet of plastic material has been effectively drawn down with chamber 20, the vacuum supply means, electrical supply means and pressure supply means are interrupted to remove the drawn-down sheet. The draw-down cycle of operation is repeated a number of times sufficient to produce the required number of drawn-down sheets.

VACUUM FRAME MEANS

Referring now particularly to FIGS. 3 and 4, a vacuum frame means 100 is provided which is used in carrying out the method of the present invention. The function of the vacuum frame means 100 is to support two sheets of pre-contoured plastic material, which have been drawn down in the draw-down chamber, to effect a vacuum between the two sheets to bring the adjacent surfaces thereof into complete abutting contact with all of the contoured surfaces.

The vacuum frame means includes a base 101 constructed to form a substantially rectangular member. Extending upwardly from opposite side edges of the base 101 are a pair of side walls 102, 103. Connected between opposite ends of the side walls 102, 103 are a pair of end walls 104, 105. The base 101, sidewalls 102, 103 and end walls 104, 105 are joined together to form a substantially upward open cavity. Located in the end walls and side walls adjacent a lower end thereof is a number of apertures 106 which will provide a vent means between the interior cavity area of the vacuum frame and the exterior area surrounding the vacuum frame. The openings 106 are provided to ensure an even pressure within the interior cavity defined by walls 104, 105.

As shown in FIG. 4, a horizontal supporting flange 107 is secured to the upper edge of the side walls 102, 103 and end walls 104, 105. The flange 107 is constructed and detailed in location such that an inner peripheral edge of the flange is in substantial vertical alignment with an inner surface or edge of the vacuum frame walls. Supported on an upper surface of the flange 107 is an inner deck member 108. Inner deck member 108 is detailed in alignment such that an inner peripheral edge thereof is in vertical alignment with the inner surface of the frame side walls and inner peripheral edge of the flange 107. An outward peripheral edge of the inner deck 108 is spaced inward of the outer peripheral edge of the flange 107, substantially as shown in FIGS. 3 and 4. Secured to the outer peripheral edge of flange 107 is an outer deck member 109. The outer deck member 109 is constructed of an angle member having an upper horizontally supported leg 110 and a vertically downward extending leg 111. The dimensions of the outer deck 109 are detailed such that the inner surface of leg 111 is in abutting contact with the outer peripheral edge of the flange 107. The outer deck 109 is secured to the flange 107 by a series of conventional connecting screw means 112 which extend through leg 111 into the flange 107.

As shown in FIG. 3, a series of outwardly directed notches 113 are formed in the peripheral edge of the outer deck horizontal leg 110. A swing-away bolt 114 is secured in position adjacent each of the notches 113. The swing-away bolts are supported for pivotal movement about a horizontal axis by a bracket means 115 which is secured to a lower surface of leg 110 and is detailed in location to allow the swing-away bolt shank portion 116 to be pivoted to a position located within notch 113. Shank 116 includes conventional external threads detailed for adjustably receiving a locking nut member 117. The swing-away bolt 114 is provided for securing additional elements of the vacuum frame means in a secure locked position as will be described in more detail herein below.

As shown in FIG. 4, the inner deck 108 and outer deck 109 defines therebetween a vacuum cavity area 118. Cavity 118 extends around the outer peripheral edge of inner deck 108 and the internal surface of the outer deck 109. The vacuum cavity 118 is connected to a conventional vacuum source by means of a vacuum connecting element 119 which is secured in the flange 107. The vacuum connection 119 includes a fluid flow passageway for exhausting air from cavity 118 to create a vacuum therein. The upper surface of the inner deck 108 is provided with a neoprene gasket 120 detailed to be complementary to the upper surface of the inner deck member 108. A number of registration pins 121 is provided in the inner deck member 108 for allowing the plastic sheet means to be secured in a proper aligned position. The registration pins 121 must be in alignment with the pins 11 of the molds and the aperture provided in the plastic sheets. The upper surface of the neoprene gasket 120 is detailed in dimension to be spaced a slight distance below the upper surface of the outer deck horizontal leg 110.

Supported on the upper surface of the neoprene gasket 120 is a vacuum plate means 122. The vacuum plate means 122 is detailed in dimensions to have an outer peripheral edge thereof which is slightly less than the dimensions of the inner peripheral edge of the outer deck 109 whereby the vacuum frame can be fitted therein, as shown in FIG. 4. The thickness of the vacuum plate 122 is detailed such that when the vacuum plate is supported in position on the neoprene gasket 120, the upper surface of the outer deck will be in horizontal alignment with the upper surface of the outer deck 109. Vacuum plate 122 includes an inner peripheral edge which is detailed in dimensions to be located a distant space inward of the inner peripheral edge of the inner deck 108, as shown in FIG. 4. The vacuum plate 122 is provided with a plurality of grooves 123 which extend along the width thereof. Grooves 123 are formed in a lower surface of the vacuum plate to define a number of downwardly opened passageways when supported above the inner deck gasket member 120. The passageways formed by the grooves 123 will allow the vacuum cavity area 118 to be in fluid flow relationship with the inner peripheral edge of the vacuum plate 122, whereby a vacuum can be created between a pair of plastic sheet members, as will be described in more detail hereinbelow.

As shown in FIG. 4, an upper pressure plate member 124 is provided to be supported on the upper surface of the vacuum plate 122 and outer deck leg portion 120. Pressure plate 124 is detailed in horizontal dimensions such that an inner peripheral edge thereof is in substantial vertical alignment with the inner peripheral surface and edges of the vacuum frame side walls, flange 107, and inner deck 108, as shown in FIG. 4. The outer peripheral edge of the upper pressure plate 124 is aligned with the outer peripheral edge of the outer deck leg 110. The lower surface of the pressure plate 124 is provided with a neoprene gasket member 125 which is bonded thereto by conventional means. The upper pressure plate 124 including gasket member 125 is provided with a series of outwardly directed notches 126. Notches 126 are formed therein in detailed alignment with the notches 113 formed in the outer deck structure 109. Notches 126 are of a dimension to allow the swing-away bolt shank portion 116 to be inserted therein whereby the upper pressure plate 124 can be securely clamped into position above said vacuum plate 122 and outer deck leg 110 by swinging bolt 114 through an arc of substantially 180° to allow the shank portion 116 to be inserted within notches 113, 126 and the vacuum plate is clamped in position by adjusting the nut 117.

The upper pressure plate 124 is provided with a number of apertures 127 which are detailed for alignment with the registration pins 121 provided on the inner deck 108. The registration 121 will maintain the upper pressure plate in a proper aligned position thereon. Gaskets of both pressure plates must securely contact entire periphery of each registration pin to prevent leakage of air into vacuum space.

With a first contoured plastic sheet member secured in place thereon, the vacuum plate 122 is again inserted into position within the inner deck 109 and in position on the upper surface of the first plastic sheet supported on the neoprene gasket 120. When the vacuum plate 122 has been inserted in position, a second similarly contoured but mating plastic sheet is placed in position above the vacuum plate and above the first plastic sheet 10. The second plastic sheet must include a number of apertures aligned for receiving the registration pins 121 of the draw-down chamber and subsequently of vacuum frame. The peripheral edge of the upper plastic sheets will extend to a position overlapping a substantial portion of the vacuum plate 122 or to a position adjacent the outer peripheral edge of the inner deck 108. After the first plastic sheet has been secured in position, the vacuum plate 122 will be located in position on the outer peripheral edge thereof and the second plastic sheet is located above the vacuum plate 122 whereby grooves 123 formed in the lower surface of the vacuum plate 122 will provide a fluid flow passageway to the interior space between the two plastic sheets.

Next, the upper pressure plate is secured in position relative to the registration pins 121 and in contact with the upper surface of the vacuum plate 122 and outer deck leg 110. With the upper pressure plate supported in position, the swing-away bolts 114 are swung through an arc of substantially 180° and then the nuts 117 are adjusted to securely clamp the upper pressure plate to the outer deck leg 110. With the upper pressure plate securely clamped in position, the neoprene gaskets 120 of the inner deck and neoprene gaskets 125 of the upper pressure plate will engage the opposite surface portions of the vacuum plate 122 and the surfaces of the two plastic sheets to securely clamp the plastic sheets on the opposite surfaces of the vacuum plate 122.

With the vacuum frame and plastic sheets assembled as described herein above, a vacuum source is connected to the connecting element 119 and is controlled to effect a vacuum within the vacuum cavity 118. As a vacuum is effected in cavity 118 air trapped between the two plastic sheets 10, 11 will flow outwardly through the grooves 123 of the vacuum plate 122 into the vacuum cavity 118. A continued operation of the vacuum source completely exhausts the air trapped between the plastic sheets 10 and 11 to bring all the contoured surfaces of the plastic sheets into complete abutting relationship against each other.

After the plastic sheets have been brought into contacting relationship and exposed through the above described photographic processes, the plastic sheets are then removed therefrom by disassembling the vacuum pressure plate 124 and vacuum plate 122 by reversing the assembling procedure described hereinabove.

OUTLINE OF THE METHOD

Figures 5, 6:
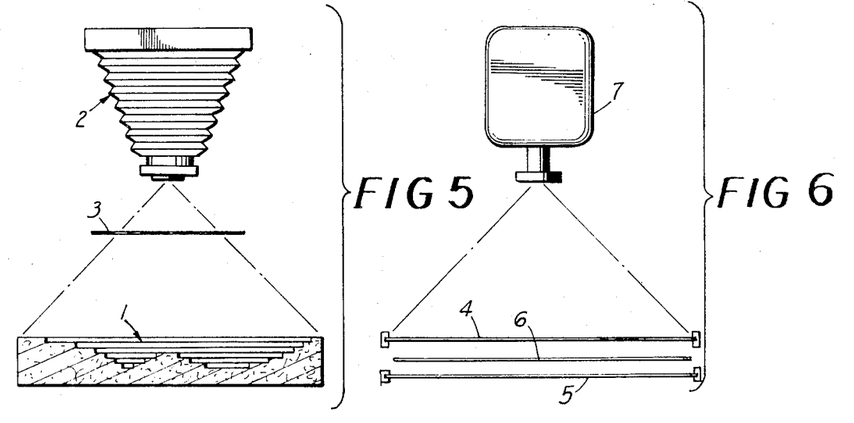
FIG. 5 is a schematic illustration of the photographing step one (1)
FIG. 6 is a schematic illustration of step two (2)

A schematic illustration of step one (1) is shown in FIG. 5 and includes the original contoured subject represented generally by the reference character 1, a conventional camera photographing apparatus 2 and a filter screen 3. The original subject 1 and camera 2 must be mounted in such positions that the base plane of the subject and the back of the camera are parallel. The two may be either on a horizontal axis or a vertical axis. The schematic illustration of FIG. 5 shows the camera and subject mounted on a vertical axis.

The original subject contoured surface 1 should be mounted on a section of conventional light colored support material (not shown) which should be trimmed to a rectangular shape with a two to three inch border space on each side of the original subject. Registration marks are placed on the border at the four corners and/or other desired positions. The marks must be placed in position corresponding to the positions of the registration pins in the above described draw-down chamber; alternatively, the position of the pins could be set to conform to the positions of the registration marks. The marks must be embossed in order that they shall register on the molds during casting. Also, the registration marks must be sufficiently coarse that they do not disappear in the conversion of film to half-tone. That is, their image on the negative must exceed the dot side of the half-tone screen.

After the original subject 1 has been properly mounted relative to the camera 2 and the registration marks have been provided, the subject is photographed independently through a number of conventional color separation filters, indicated by the reference character 3. For three-color work, the filters are designed to pass only one of the tristimulus colors magenta (red), cyan (blue) or yellow for each of the produced negatives. For four-color work, a fourth negative is prepared to pick up the black lines of printed material, such as contoured lines. Since the latter are important features of most subjects, the black/white negative should be included. Completion of step one (1) will provide a corresponding number of film negatives 4, one representative of each of the colors to be reproduced.

Step two (2) is schematically illustrated in FIG. 6 and requires the production of a half-tone film positive for each of the film negatives produced in step one (1). The film positives are produced by exposing a fresh film negative 5 through a half-tone screen 6 individually through the film negatives 4. A conventional light source means 7 is utilized to expose the fresh film 5.

In the half-tone process, a fresh film 5 is exposed to the film negative 4 through a half-tone screen 6 that converts the image into a dot pattern, in which the size of the dots varies with the intensity of color in the image. Thus, from each of the color separated negatives, there will be produced a half-tone film positive in which those areas of the subject that are deep in their color component are represented as areas of large dots with very little void space between. Those areas of the subject that are of low color intensity will be represented by areas of very small dots, with large void spaces between. In three-color work, the screen is rotated between colors so that the dots of varying colors do not overlay one another.

The black/white film should not be converted to a half-tone. Instead, it should be double printed in a conventional manner on high contrast film to accentuate line work and reduce color. Excessive color in areas other than line work should be opaqued out by manual retouching during this step.

Figure 7:
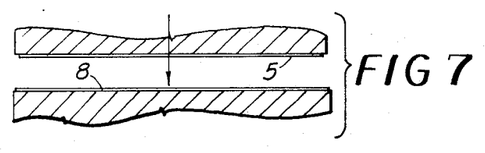
FIG. 7 is a schematic illustration of step three (3)

The half-tone films prepared above in step two (2) from the color separated negatives are film positives. Step three (3) requires contact printing, by conventional means as illustrated in FIG. 7 of the film positives 5 onto film 8 to obtain half-tone color separated negatives for each of the film positives. The half-tone color separated negatives are used in subsequent enlargement processes to be described in more detail hereinbelow in step seven (7).

Figure 8:
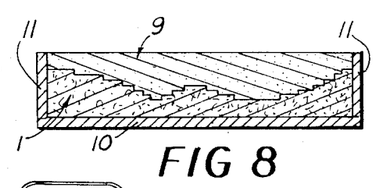
FIG. 8 is a schematic illustration of step four (4)

Step four (4), schematically illustrated in FIG. 8, includes the preparation of a number of molded impressions 9 of the original subject 1, each of the molded impressions including a surface portion complementary to the surface of the original subject. In the molding step four (4) the original subject will be referred to as the male and the molded impression referred to as the female. The molding step of the present invention is effected with plaster-of-Paris using conventional techniques as will be described below.

The surface of the original subject is first treated to render it non-adhesive to plaster-of-Paris. If the surface is of a porous material, it must be sealed by spraying with several coats of lacquer. A satisfactory lacquer for this purpose is "Deft," which is dispensed in aerosol containers. After the lacquer coat is thoroughly dry, it is sprayed with a suitable release material. The release material is applied in several successive applications, with thorough rubbing to obtain a uniform distribution between applications. The final application should be rubbed sufficiently to remove all excess agent, so that none remains to be absorbed by the plaster-of-Paris.

The subject 1 is placed on a surface of a conventional shaker table (not shown) with the support board 10 flat against the table. The sides 11 of the mold box are clamped into position against the sides of the subject by conventional means (not shown) so that they accomplish two purposes simultaneously; they fit tightly against the subject to prevent loss of the plaster mix from the mold, and they clamp the subject tightly against the surface of the table so that the table vibrations are transmitted in full force to the surface of the subject. The sides 11 of the mold box should be treated with a heat release agent, again in the same manner as the surface of the subject. The depth of the mold box should be approximately one inch greater than the overall height of the subject plus support board.

The volume of space to be filled with plaster-of-Paris mix is estimated, and this volume of water is placed in a suitable mixing vessel. The quantity of plaster-of-Paris required varies with conditions. Water and plaster should be proportioned to give a mix having the following characteristics:

(a) somewhat thicker than buttermilk, so that when poured it does not immediately form a level surface, but peaks slightly; and
(b) responds immediately to vibrations, becoming completely fluid and flowing into all features of the subject.

If a larger quantity of plaster is required, it is preferable to mix it in small lots, so that a single lot may be added in between successive reinforcing steps.

With the table vibrator turned on, the plaster mix is added to a depth of about one inch, a conventional cheese cloth or burlap material (not shown) saturated with plaster mix is placed on the free surface of the plaster, but not on any part of the surface of the subject that might still be exposed. A second inch of plaster mix is added and again covered with saturated fabric material. The process is repeated until the subject is completely submerged in plaster mix. At about three-fourths inch from the top, a conventional wire mesh material (not shown) is placed on the surface of the mix, and the final quantity of plaster is added.

With vibrators still in operation, a straight edge or flat surface (not shown) is used to level the surface of the casting precisely with the top rim of the mold. Rises must be scraped down, and cavities filled in, so that the completed impression will fit firmly against the support pad of the draw-down chamber 20. Vibration is stopped when the mix achieves an initial set, and is no longer fluid.

When the plaster has acquired permanent set, the sides 11 of the mold box are removed, the cast is inverted, and the mounted subject is carefully peeled up from the surface, starting at one corner. Any defects in the molds are best repaired while the cast is still green using fresh plaster to be applied by a conventional sculptor's hand tool. The cast should be stored in a dry place at moderate temperatures until further weight loss indicates that all excess moisture has evaporated.

Male casts are prepared by using the female casts, with suitably prepared surface, as a mold. The mold box and shaker table are used as before.

Steps five (5) and six (6) include the preparations of draw-down impression on the complementary female mold. Steps five (5) and six (6) are schematically illustrated by the draw-down chamber 20 of FIG. 9 and which was described in detail herein above. In the preparation of the draw-down impressions of the complementary female mold, the female mold 9 is positioned within the draw-down chamber 20, a sheet of plastic material 12 is positioned in the draw-down chamber and the draw-down chamber is operated as described herein above to effect a draw-down of a sheet of clear vinyl plastic material of the female mold.

The first plastic sheet of clear vinyl drawn-down impression is removed and the step is repeated until a clear vinyl draw-down impression is produced for each of the colors to be reproduced, plus a few spare sheets.

After the clear vinyl plastic draw-down impressions of the female mold have been produced, a number of opaque white impressions is produced against the female mold. The number of opaque white draw-down impressions should correspond to the number of items to be produced, plus a few additional opaque white draw-down impressions in case of damage to some of the others.

Figures 9, 10, 11:
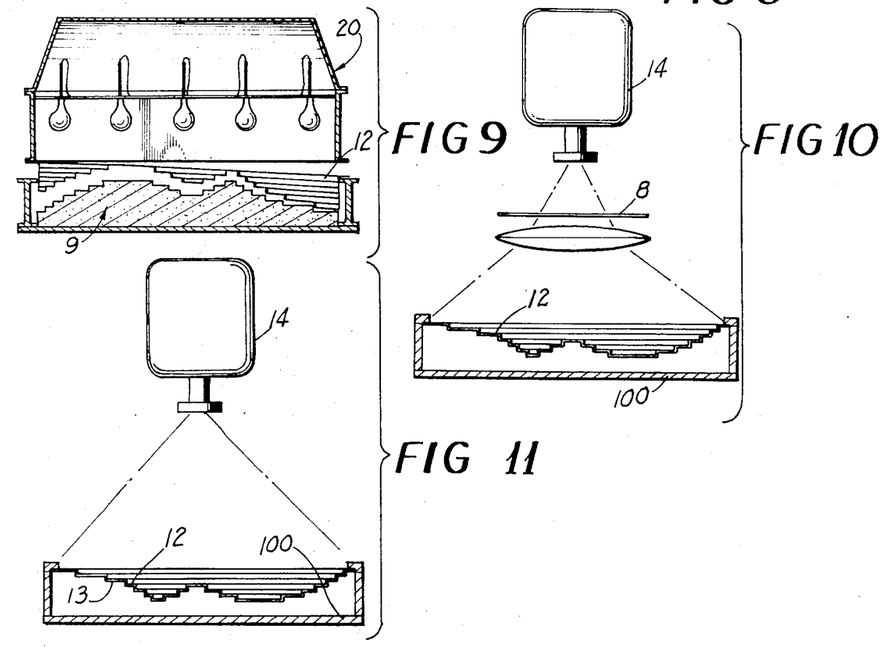
FIG. 9 is a schematic illustration of steps five (5) through seven (7)
FIG. 10 is a schematic illustration of step eight (8)
FIG. 11 is a schematic illustration of step nine (9)

After production of the clear vinyl and opaque white draw-down impressions against the female mold of steps five (5) and six (6), the female mold is removed and the original subject or male mold is positioned in the draw-down chamber and a number of clear vinyl plastic draw-down impressions of the original subject mold is produced in step seven (7). The number should correspond to the number of colors to be reproduced, plus a few spare sheets in case of damage.

After the draw-down impressions produced in steps five (5) through seven (7) have been completed, preparation of contoured film positives are produced in step eight (8). The production of the contoured film positive is schematically illustrated in FIG. 10. Step eight (8) requires preparation of a number of contoured film positives, one for each color of the prepared half-tone positives of step three (3). The film positives of step eight (8) are produced on the clear vinyl plastic draw-down impression of the complementary female mold. Before the contoured film positives are produced on the clear vinyl plastic draw-down impressions, the surfaces, of the impressions must be completely clean, after which a conventional photographic emulsion is applied to the surface of the complementary draw-down impressions. Application and drying of emulsion must be done entirely under darkroom conditions which includes the conventional safe light and development equipment (not shown) required for a darkroom.

The emulsion is applied by conventional paint spray equipment (not shown) adjusted to provide a fine mist. Several coats are required for proper thickness. The coated and dried film is handled in the same manner as any photographic film; that is, it is kept under complete darkness except when handling under safe light in the darkroom. Preparation of the contourned film positives requires the use of the above described vacuum frame means 100 and utilization of a conventional enlarging projector means 14. The vacuum frame 100 is monuted in position opposite enlarging projector 14, in which one of the half-tone separated negatives 8 is properly positioned, as shown in the schematic illustration of FIG. 10.

To secure good registration, one of the opaque white drawn-down impressions, produced in step six (6), painted flat black, is placed in the vacuum frame 100 as the lower impression. The vacuum plate 122 is added and then the upper impression, an unpainted white draw-down, is inserted. The pressure plate 124 is added, the vacuum is turned on and the bolts tightened as described above in the description of the vacuum frame means. With lights out, the projector 14 is turned on, and the positions of film, projector and vacuum frame are adjusted to obtain perfect registration of the projected image on the plastic impression. These positions are locked in.

The upper white plastic impression is removed from the vacuum frame, and an emulsion coated clear vinyl plastic impression of the female mold is placed in the vacuum frame. The vacuum is pulled, as before, and the exposure is made by turning on the projector lamp for a predetermined number of seconds to adequately expose the supported and coated clear vinyl plastic impression to the color representation included on the printed film positive prepared in step three (3). The exposed film is then removed from the frame, developed and fixed in standard photographic chemicals in a conventional manner, and then dried.

The process is repeated for each of the color separated half-tone positives produced in step three (3). Presumably, the lock in of projector, film and vacuum frame accomplished above will suffice; however, if the film positive is altered in changing from one color to another, the registration step must be repeated. The sheets of draw-down plastic material prepared in step eight (8) is a series of male, half-tone positives, one for each of the colors, and a high contrast continuous tone black for line work.

Step nine (9) includes the preparation of contoured film negative and requires a utilization of the clear plastic draw-down impressions of the male or subject mold produced in step seven (7) and a utilization of the contoured film positives produced in step eight (8), as indicated in the flow diagram of FIG. 13. FIG. 11 shows a schematic illustration of step nine (9) and requires the use of the vacuum frame means 100 and the projector 14. Each of the clear plastic impressions of the male mold is coated with a photographic emulsion, dried, in the same manner as described above in regard to the complementary impressions. Each is mounted individually in the vacuum frame as the lower impression and one of the film positives previously prepared in step eight (8) is mounted as the upper impression. The vacuum of the vacuum frame means is drawn, as described herein above, and the exposure is made for the same period of time, but with no film in the projector. That is, the projector is used solely as a light source for contact printing.

The lower impression is removed, developed, fixed and dried utilizing conventional photographic techniques. This negative is used for printing the represented color on the white plastic impression, as will be described hereinbelow in step ten (10). The film positives are carefully stored to be used in making additional negatives, if such should be required.

Step ten (10) includes the preparation of the full colored contoured print by utilizing the contoured film negatives prepared in step nine (9) and utilizing the white opaque plastic draw-down impressions prepared in step six (6), as indicated by the flow diagram of FIG. 13. Step ten (10), as shown in the schematic illustration of FIG. 12, requires the utilization of the vacuum frame means 120 and utilization of a fluorescent lamp means 15. The opaque white impressions on which the full colored prints are to be produced are effectively cleaned and the colors represented in the contoured film negatives are applied one at a time, each being developed and dried before application of the next. The order in which the colors are applied affects, to a degree, the blend of tones in the final product. Consequently, the intensity of each color must be adjusted with respect to that of the other colors and with respect to its position in the color sequence. The most satisfactory sequence is usually that in which the most intense color is applied first, the least intense last, except that the black contour line work might be applied after the others.

The half-tone color printing process utilizes a conventional resist material which is deposited on a "go or no go" basis, with the color incorporated in the photo-resist material that either stays on or is washed off, depending upon whether it has been hardened by exposure to light. To this conventional photo-resist material we add pigments (or dyes) in colors corresponding to the tri-stimulus colors and black.

After the opaque white plastic draw-down impressions have been cleaned, they are coated with a photo-resist emulsion, then allowed to dry. The photo-resist emulsion is applied by conventional spraying means in similar manner that the photographic emulsion is applied to the contoured film positives and negatives of steps eight (8) and nine (9). Special care must be taken in obtaining the finest mist from the spraying means utilized, letting the number of coats control the desired color intensity or thickens. Darkroom conditions must be maintained and the dried impression should be kept in a complete darkness until used.

The opaque white plastic draw-down impression is coated with the first color, then dried and mounted in the vacuum frame means 100 as the lower impression. The contoured negative produced in step nine (9), for the corresponding color of photo-resist material applied, is mounted as the upper impression and the vacuum is drawn to insure intimate contact between the two.

The fluorescent lamp means 15 is then turned on to expose the opaque white plastic impression coated with the photo-resist material to light through the colored contoured film negative for a predetermined period of time. When the first color has been exposed, it is removed from the vacuum frame, developed by washing in warm water and dried. The second color of photo-resist material is applied, exposed through its associated contoured negative, developed and dried. This process is repeated for each color of the contoured film negatives to obtain the finished colored contoured replica, exact in color and contoured dimensions of the original subject.

After one of the finished colored contoured replicas has been completed, a second white plastic draw-down impression is individually coated with photo-resist emulsion, exposed to the colored contoured film negative and developed. This step is repeated until the required number of colored contoured replicas have been produced.

It now becomes apparent that the above described illustrative embodiments and outlines of the required method steps are capable of producing the above stated objects and advantages. It is obvious that those skilled in the art may make modifications in the details of construction of the illustrative embodiments and required method steps of the present invention without departing from the spirit of the invention, which is to be limited only by the scope of the appended claims.

What is claimed is:

1. A method of producing colored contoured replicas of a contoured surface, including the steps of:
    (a) photographing said contoured surface independently through a number of colored filter screens to produce a corresponding number of film negatives, one representative of each of the colors to be reproduced;
    (b) producing a film positive from each of said film negatives, by exposing a fresh film negative through a half-tone screen to convert the color image of the film negative into a dot pattern having varying intensity representative of the photograph color;
    (c) printing said film positives onto film to obtain half-tone color separated negatives to be used in subsequent enlargement processes;
    (d) making a number of molded impressions of said subject contoured surface, each of said impressions including a surface portion complementary to the surface of said original subject;
    (e) making a number of draw-down impressions of clear vinyl plastic, drawn down against said complementary surfaces of said impressions;
    (f) making a number of clear vinyl plastic draw-down impressions, drawn down against the surface of said original contoured subject;
    (g) making a number of opaque white plastic impressions drawn down against said complementary surface of said impression of said original subject;
    (h) preparation of a number of contoured film positives, one for each color of said prepared half-tone negatives, by coating the surface of one of said previously formed clear vinyl plastic draw-down impressions of said original subject with a photographic emulsion, individually exposing said coated drawn down impression to one of the half-tone separation negatives with an enlarging projector and thereafter developing the exposed film;

(i) preparation of contoured film negatives, one for each color of said contoured film positives, by coating said clear plastic draw-down impressions of said complementary surface with a photographic emulsion, supporting said clear plastic draw-down impression of said complementary surface adjacent said developed contoured film positives of said original subject and exposing said supported impressions to light for a period of time and thereafter removing said complementary impression for development by photographic development techniques; and (j) preparation of full colored contour print onto the opaque white plastic drawn down impression by coating said opaque white impression with photoresist material and exposing said coated opaque white plastic drawn down impression to each of the prepared contoured film negatives, individually and thereafter developing and drying the colored prints.

2. A method of producing colored contoured replicas as described in claim 1 further characterized in that said impressions having said complementary surfaces are made by coating the upper surface of said subject mold with a release agent, filling said mold with a plaster-of-Paris material, vibrating said subject mold, adding a number of layers of fabric material at a predetermined location within said plaster-of-Paris mixture, adding still additional amounts of plaster-of-Paris mixture, adding a wire screen reinforcing material at a predetermined location with said plaster-of-Paris mixture, leveling the top of the mold; allowing said mold and plaster-of-Paris mixture to set up sufficiently and thereafter removing the mold and impression.

3. A method of producing colored contoured replicas as described in claim 1 further characterized in that said draw-down impressions are made by supporting a sheet of plastic material adjacent the contoured surface of said subject mold, effecting a vacuum between said plastic sheet and said contoured surface, heating said plastic sheet, and applying a pressure to the side of said plastic sheet opposite said subject mold whereby said plastic sheet will be drawn down against the surface of said subject mold and will assume the contoured shape thereof.

4. A method of producing colored contoured replicas as described in claim 1 further charactarized in that said individual contoured film positives are prepared by coating the surface of said original subject draw-down sheet with a photographic emulsion, supporting the coated plastic draw-down sheet in front of a painted complementary plastic draw-down sheet, effecting a vacuum between said adjacent plastic draw-down sheets and exposing said coated plastic draw-down sheet to an enlarging projector having a half-tone separation negative a sufficient time to produce a contoured film positive.

References Cited

UNITED STATES PATENTS

| | | | |
|---|---|---|---|
| 1,456,954 | 5/1923 | Lücken | 96—46 |
| 3,368,471 | 2/1968 | Beato | 96—46 X |
| 3,253,917 | 5/1966 | Flynn | 96—30 |
| 2,798,428 | 7/1957 | Tollenaar | 96—30 X |
| 1,792,486 | 2/1931 | Feinberg | 264—227 X |
| 2,537,329 | 1/1951 | Campbell | 96—46 X |
| 3,122,437 | 2/1964 | Collins | 96—46 |
| 3,458,614 | 7/1969 | Knoll | 264—219 X |
| 2,468,731 | 5/1949 | Borkland | 264—219 X |
| 2,390,618 | 12/1945 | Roehm | 101—32 |
| 2,309,627 | 2/1943 | Cooke et al. | 161—1 X |

ROBERT F. WHITE, Primary Examiner

A. M. SOKAL, Assistant Examiner

U.S. Cl. X.R.

264—89, 129, 226; 96—30, 46